W. A. BROWNRIGG.
MACHINE FOR SLITTING REINFORCE STRIPS.
APPLICATION FILED APR. 8, 1911.
1,000,664.
Patented Aug. 15, 1911.
2 SHEETS—SHEET 2.
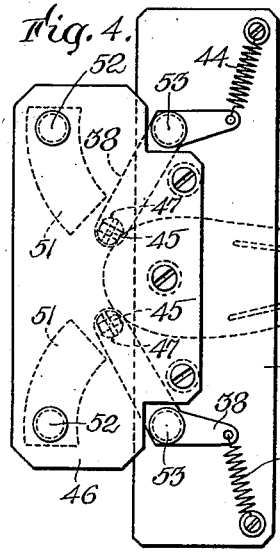
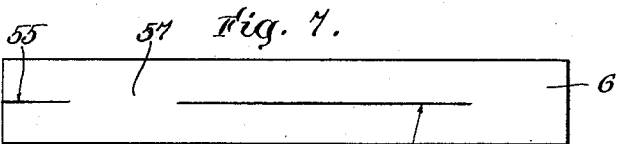
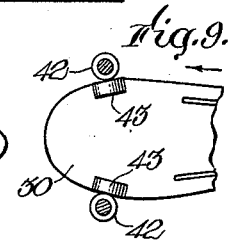
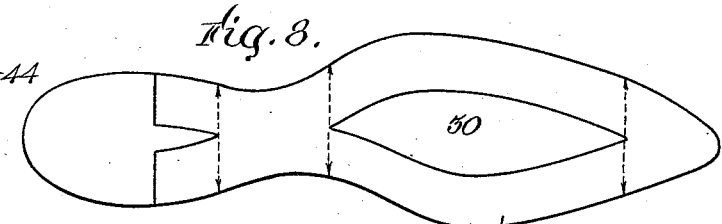
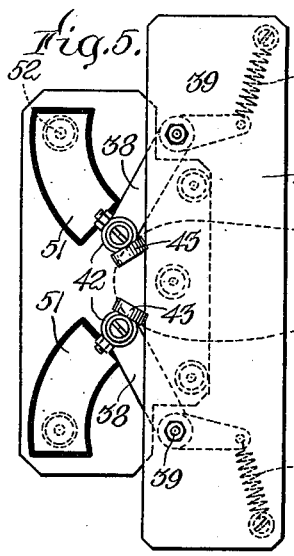
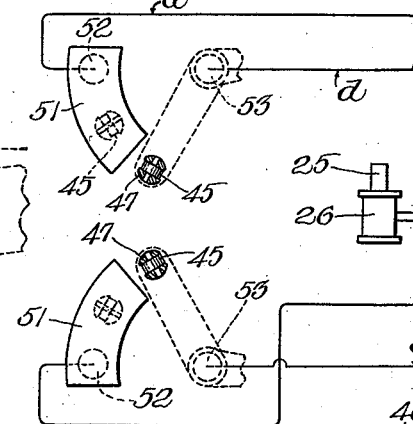
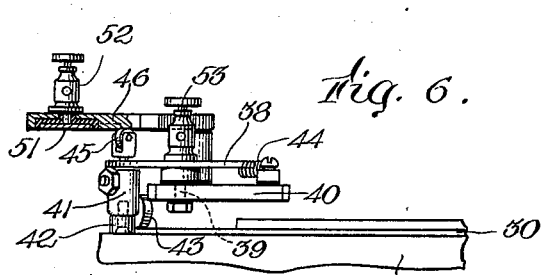
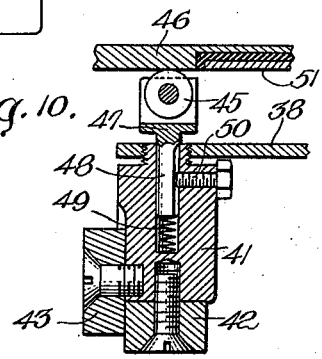
Witnesses:
Harry L. Allen
P. W. Pezzetti
Inventor:
William A. Brownrigg
by Wright Brown Quinby May
Attorneys.

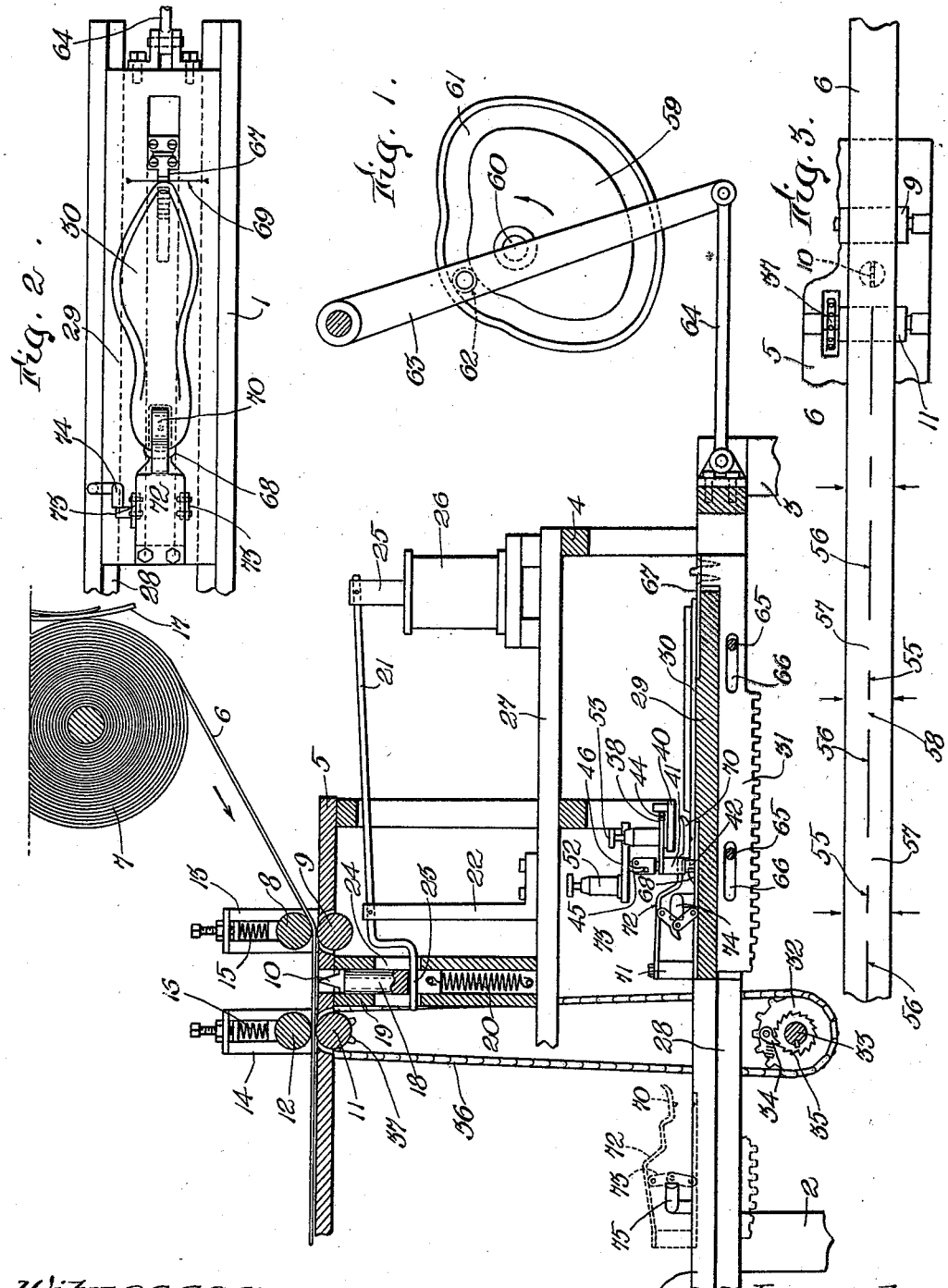

UNITED STATES PATENT OFFICE.

WILLIAM A. BROWNRIGG, OF BOSTON, MASSACHUSETTS.

MACHINE FOR SLITTING REINFORCE-STRIPS.

1,000,664.

Specification of Letters Patent. Patented Aug. 15, 1911.

Application filed April 8, 1911. Serial No. 619,722.

*To all whom it may concern:*

Be it known that I, WILLIAM A. BROWN-RIGG, of Boston, in the county of Suffolk and State of Massachusetts, have invented certain new and useful Improvements in Machines for Slitting Reinforce-Strips, of which the following is a specification.

The present invention relates to a machine for preparing insole reinforcing strips of the character shown and described in the patent to Thomas J. Ryan, No. 958,013, dated May 17, 1910. In that patent a reinforcing device for leather insoles is described, which consists of a strip of fabric substantially equal in width to the narrowest part of the insole, but of less width than the widest part of the sole, which is slit at the parts which lie against the wider parts of the sole and spread where slit to bring the edges of such parts to the channel lip or stitch-receiving rib of the sole.

My object in making the present invention has been to provide a machine capable of slitting reinforcing strips of this character through distances commensurate with the wide portions of the insoles to which the strips are to be applied, and automatically governing the length of the slits in proportion to the lengths and widths of the insoles to which they are respectively to be applied.

In the preferred mode of carrying my invention into effect, I provide means for periodically slitting a continuous strip of fabric which is subsequently to be cut into pieces, and a means for controlling the lengths of the slits in exact proportion to the longitudinal extent of the wide parts of the several insoles to which the pieces cut from the strip are designed to be applied.

I have illustrated one possible embodiment of the invention on a concrete machine in the accompanying drawings, and have described this embodiment in detail in the following specification.

I desire it to be understood that I do not intend to limit the scope of the invention to the specific machine herein shown and described, since the essential principles of the invention may be equally well employed in many diverse constructions and combinations.

In the accompanying drawings,—Figure 1 represents a longitudinal sectional view of a machine embodying the principles of my invention. Fig. 2 is a plan view of the carrier for the insole which is used to control the lengths of the slits. Fig. 3 is a plan view of a strip of fabric which has been slitted by this machine prior to the subdivision of the same into lengths suitable for individual reinforcing pieces. Fig. 4 is a plan view in an enlarged scale of the elements by which an insole controls the lengths of the slits. Fig. 5 is an under plan view of the same. Fig. 6 is an elevation of the same. Fig. 7 is a plan view of a single reinforcing piece after the same has been cut from the strip. Fig. 8 is a plan view illustrating the manner in which the slitted reinforcing piece is spread to fit the insole. Fig. 9 is a sectional plan view of a detail of the means by which the insole controls the slitting mechanism. Fig. 10 is a vertical sectional view on an enlarged scale of the elements shown in Figs. 5 and 6. Fig. 11 is a diagrammatic view of the electric circuit by which the operation of the slitter is controlled.

Similar reference characters indicate the same parts wherever they occur.

Referring to Fig. 1 wherein so much of the machine as is material to an understanding of the present invention is shown, the character 1 represents part of a bed supported by legs 2, 3, and supporting a frame 4 which carries a table 5. I have not shown either the entire table, all of the frame, which supports the table, nor all of the supports of the bed 1, for the reason that these parts may be constructed in any way suitable to the purposes of the user of the invention, and their complete illustration in detail is not essential to an understanding of the principles of the invention.

A fabric strip 6 from which reinforcing pieces are to be cut is led from the roll 7 between a pair of guide rolls 8, 9, over a slitting knife 10, and between feed rolls 11, 12. The upper rolls 9 and 12 of each pair are mounted movably in guides 13 and 14 respectively, and are pressed against the strip by adjustable springs 15 and 16. The function of the rolls 8 and 9 is to hold the strip close to the table while the function of the feed rolls 11 and 12 is to draw the strip from the supply roll 7 past the slitting knife. Any sort of brake or tension device 17 may be provided to bear against the supply roll 7 to maintain a tension in the strip.

The slitting knife is mounted upon a carrier or plunger 18 movable in a guide 19. The movement of the carrier is such that the knife may be either projected above the surface of the table 5 or withdrawn below the same. It is normally retained in its withdrawn or retracted position by a spring 20 which is connected to the carrier and to the guide or frame substantially as shown in Fig. 1. A lever 21 mounted pivotally upon a bracket 22 has an arm 23 passing through an opening 24 in the guide 19 into engagement with the carrier 18. The other arm of the lever is connected to the core 25 of a solenoid 26 which, when made operative by an electric current, acts to withdraw the core 25 and project the knife carrier. The guide, bracket and solenoid are mounted upon a platform 27 which forms part of the frame 4.

The bed 1 is composed in part of guide ways 28 in which travels a slide or moving table 29, carrying an insole 30 which serves as a pattern to control the action of the slitting knife. The slide also carries means for operating the feed rolls to advance the strip. Such means consist of a rack 31 which in the advance of the slide engages the teeth of a pinion 32 which is mounted loosely upon the shaft 33 and carries the pawl 34 arranged to engage a ratchet 35 which is secured to the shaft. Also secured to the shaft is a sprocket wheel around which passes a chain 36. The chain also passes around and engages a sprocket 37 on the shaft of the feed roll 11. Thus the feed roll is operated to advance the strip whenever the slide 29 is moved from right to left as shown on Fig. 1, while it remains stationary without either advancing or retracting the strip when the slide returns. Through the connections described, whenever the slide 29 is reciprocated, a length of the strip sufficient to form a reinforcing piece for the insole carried by the slide is drawn from the supply roll. At the same time those parts of the strip which are subsequently to be spread apart at the wider portions of the insole are slitted by the knife 10 under the control of the insole itself.

For accomplishing the result last named, I provide a pair of switches which are operated by the insole to open and close the circuit of the solenoid 26 and thereby cause intermittent operation of the slitting knife. These switches consist of levers 38 (shown best in Figs. 4, 5, and 6) which are pivoted upon studs 39 carried by a bridge 40 which is suspended over the slide 29. The levers 38 carry studs 41 each having an anti-friction roll 42 engaging the edge of the inner sole and a second roll 43 overlying the upper surface of the insole near its edge. The rolls 42 are pressed yieldingly against the opposite edges of the inner sole by springs 44, and as the irregular contours of the sole pass between the rolls 42 of the two levers the latter are caused to swing back and forth. The function of the rolls 43 is to prevent the edges of the inner sole from being curled up by the pressure exerted by the springs 44, particularly when the stock of which the insole is made is thin and flexible. The levers 38 carry switch contact members 45 pressing yieldingly against the under side of the plate 46 which is supported by the bridge 40 and is somewhat separated therefrom. As here shown the switch members 45 are rolls carried by holders 47, each holder being provided with a shank 48 contained in a socket in one of the studs 41 and pressed toward the plate 46 by a spring 49. A stud 50 which acts as a key or feather projects into a groove in the shank 48 to prevent the holder 47 from turning. Set into the under surface of the plate 46 are switch contact pieces 51 which are insulated from each other and from the bridge 40 and levers 38. These contact plates 51 are in electrical engagement with binding posts 52, and the levers 38 are similarly connected with binding posts 53. These two sets of binding posts are connected respectively with the terminals of the solenoid winding and with the terminals of a battery circuit, or the circuit of any other source of electric energy. As appears from the diagrammatic view in Fig. 11, the terminals $a$ and $b$ of the solenoid winding are connected with the binding posts of the contact pieces 51, while the source of electric energy which is here shown as a battery $c$, has its opposite poles connected by the wires $d$ and $e$ with the binding posts of the two switch levers 38 respectively. This precise arrangement of circuits is not essential to my invention, but may be reversed without departing from the spirit thereof.

The arrangement of the switches is such that when the narrow parts of the insole lie between the studs of the switch levers, such switch levers are out of connection with the contact strips, as shown in Figs. 4, 5, and 11, but when the wide parts of the sole pass between the studs, the contact disks 45 of the switch levers make electrical connection with the members 51, and complete the circuit between the battery and the solenoid. Thus when the wide parts of the sole pass between the switches, the solenoid is energized and the slitting knife is made operative to cut the strip while at other times the knife is withdrawn and the strip passes without being cut.

The result of a series of operations is shown in Fig. 3 where the strip is shown with short slits 55 alternating regularly with long slots 56. Each short slit is formed while the heel part of an insole passes between the switch members, while each long slit is formed while the fore-part of the sole thus passes between the switch members. The uncut portion 57 between a short and a long slit passes the knife while the shank portion of the insole is between the switch members and the slitting knife is withdrawn into the inoperative position. The uncut part 58 between each long slit and the next succeeding short slit is left intact by reason of the narrow toe-part passing the movable switch members and allowing them to pass out of contact with the stationary contact pieces. The strip is subsequently cut approximately at the points indicated by the arrows shown in Fig. 3 to form separate reinforcing blanks as shown in Fig. 7. When such a blank is applied to an insole, the slits allow its sides to be spread out somewhat as shown in Fig. 8, whereby outer edges may be tucked into the inside channels of the sole and laid against the channel lips. The edges of the reinforcing piece are trimmed off as described in the patent above referred to.

It will be observed from Fig. 8 that the reinforcing piece is shorter than the insole, being only as long approximately as the channel lips and not extending as far as the heel end of the sole. In order that the strip may not be fed more than enough at each operation to provide a blank of the necessary length, provision is made for lost motion of the sole carrying slide or carriage relatively to the strip feeding mechanism. As appears from Fig. 1, the rack 31 is out of engagement of the pinion 32 when the slide 29 is at the beginning of its travel and it does not engage the pinion until the part of the sole at which the channel lips begin is between the movable switch members. At this point, the feed of the strip commences and it continues to the end of the travel of the carriage. Thus only a sufficient length of the strip is fed at each operation to make a reinforcing blank of the proper length without waste. It is desirable also to vary the amount of this lost motion in accordance with the soles of different lengths, in order to make allowance for the difference in soles of different lengths, of the distance from the heel end to the end of the stitch-receiving ribs. This distance is greater in large soles than small ones, and to make allowance for it insures proper timing of the strip feed to place the slits in the right places to accommodate the wide parts of these different soles. To accomplish this object I make the rack 31 adjustable on the carriage because the travel of the latter is the same under all conditions. The carriage is operated by a cam 59 carried by a rotating shaft 60 and having a groove 61 which contains a roll 62, carried by a lever 63, which lever is connected by a link 64 with the slide. The rack is connected to the carriage by pins or rods 65 on the carriage which pass through slots 66. A graduated tongue 67 is secured to the rack and occupies a groove in the surface of the passage and is in such a position that the sole may lie over it. Soles of all lengths are positioned on the carriage by reference to a gage 68 against which the heel end of the sole is placed. Its toe-end overlies the graduated tongue 67, which bears numbers corresponding to the length sizes of the soles. In adjusting the rack for a certain size of sole, the rack is placed so that the number on its scale corresponding to the size of the sole lies opposite to an index mark 69 on the carriage. In this way the rack may be adjusted to allow greater or less lost motion of the carriage before it actuates the strip feed according as the distance between the heel end of a sole and the points where the stitch receiving ribs begin is greater or less, and such lost motion is governed by the length of the sole which serves as the pattern for controlling the devices which operate the sliding knife.

It is necessary to provide means to hold the sole upon the carriage and for this purpose I provide a clamping foot 70 which is secured to a block 71 on the carriage and is pressed toward the surface of the latter with a strong yielding pressure. Preferably the foot is formed on the end of a strip 72 of stiff spring metal, of which its own resiliency gives the desired spring pressure. Between the spring strip 72 and the slide 29 is a toggle joint 73 which is acted upon at opposite ends of the travel on the carriage by stops 74 and 75 respectively, secured to the bed beside the carriage. At the end of the operative trip of the carriage, the stop 75 straightens the toggle and releases the clamping foot as shown in dotted lines in Fig. 1, allowing the insole to be removed while at the end of the return trip the stop 74 breaks the toggle and allows the clamping foot to bear against another inner sole which has meanwhile been laid upon the carriage.

From the foregoing, it will be understood that my invention comprises a means for slitting reinforcing pieces for insoles in which the insole to which the reinforcing strip is to be applied, or a pattern of the same form and size, constitutes the pattern by which the length of the slits and their position with respect to the longitudinal dimensions of the reinforcing piece are gaged.

I claim:—

1. A machine for slitting insole reinforces, comprising a slitter, means for producing a relative feed movement between the reinforce and slitter, and means controlled by the insole for which the reinforce is intended for causing said slitter to enter and withdraw from the reinforce.

2. A machine for slitting insole reinforces, comprising a slitter, means for producing a relative feed movement between the reinforce and slitter, and means controlled by the insole for which the reinforce is intended for causing said slitter to enter the reinforce at the part thereof which is adapted to be applied to the wide part of the sole and to remain therein during an extent of such feed movement equal to the length of the wide part of the sole.

3. A machine for slitting insole reinforcing strips, comprising a slitter, means for producing a relative feed movement between the slitter and strip, means for causing the slitter to enter and withdraw from the strip, and a pattern in the form of a sole arranged to control said slitter-operating means.

4. A machine for slitting insole reinforcing strips, comprising a cutter, a pattern in the form of an insole to which the strip is to be applied, devices controlled by the pattern for causing the cutter to become operative upon those parts of the strip which are to lie against the wide parts of the insole, and means for producing relative feed movements simultaneously between the strip and cutter, and between the pattern and said devices.

5. A machine for slitting insole reinforcing strips, comprising a slitter, electro-magnetic means for causing the slitter to extend into the strip, a pattern in the form of an insole, a switch operated by said pattern for causing the electro-magnetic means to become operative and inoperative, and means for producing relative feed movements simultaneously between the strip and slitter, and between the pattern and switch.

6. An apparatus for slitting a reinforcing strip, comprising a cutter, a pattern in the form of an insole to which the strip is to be applied, and means controlled by the pattern for causing said cutter to cut the strip longitudinally at those parts only which are to be applied to the wider parts of the insole.

7. An apparatus for slitting a reinforcing strip, comprising a slitter, a holder for a pattern in the form of an insole, means operable to bring the slitter into and out of the strip, control devices for said means operable by a pattern held by said holder, and means for producing simultaneous continuing feed movement between the strip and slitter and between the insole holder and control devices respectively, whereby the slit is produced by relative movement occurring while the slitter is in the strip.

8. An apparatus for slitting a reinforcing strip, comprising a slitter, means for holding the strip adjacent to, and carrying it past, the slitter, an insole carrier, means for securing an insole thereon, and means controlled by the insole for projecting the slitter into the strip and withdrawing it therefrom, said means including a movable device engaged with and movable by the edge of the insole, so arranged as to cause projection of the slitter into the strip when the wide part of the insole acts on said device.

9. An apparatus for making discontinuous slits in a strip, comprising mechanism arranged to advance a strip lengthwise, a cutter past which the strip is drawn, mounted with provision for moving into and out of the strip during the advance of the latter, a pattern movable simultaneously with the strip, and means controlled by the pattern for so moving the cutter.

10. An apparatus for slitting an insole-reinforcing strip, comprising a slitting cutter, a strip feeder located to advance the strip past and in close proximity to the cutter, electro-magnetic means for causing projection and retraction of the cutter, a switch in the circuit of said electro-magnetic means, and a pattern in the form of a sole movable simultaneously with the strip and arranged to actuate said switch by its edge and thereby make and break the circuit during the movement of itself and of the strip, whereby the cutter is held in the strip while certain parts of the pattern pass the switch.

11. A machine of the character indicated, comprising in combination, a carriage on which a sole may be held, mechanism for moving said carriage, strip feeding means operable together with said carriage, a cutter movably mounted with provision for being projected into and withdrawn from the strip, devices arranged to make contact with a sole held on the carriage and to be moved by the contours thereof, and means controlled by said devices for projecting and retracting the cutter.

12. In a machine of the character described, a slitting knife, pattern-controlled means for making said knife operative, a carriage adapted to hold a pattern, means for moving said carriage and therewith the pattern to cause operation of the knife, a strip feeding means arranged to advance a strip in a path such as to engage the knife when the latter is operative, and connecting mechanism through which the movement of said carriage causes the strip-feeding means to be actuated.

13. In a machine of the character described a slitting knife, pattern-controlled means for making said knife operative, a carriage adapted to hold a pattern for controlling said means, means for moving said carriage, strip-feeding means arranged to feed a strip in a path such that it is cut by the knife when the latter is operative, and lost motion connections through which the carriage, in each cycle of its movements, actuates said strip-feeding means intermittently to advance the strip through a less distance than that through which the carriage is moved.

14. In a machine of the character described, a slitting knife, means for rendering said knife temporarily operative under control of a pattern, a carriage adapted to hold a pattern sole, means for moving said carriage, strip-feeding means arranged to advance the strip past the knife in such a location that it is intersected by the knife when the latter is operative, lost motion connections through which the carriage, in each cycle of its movements, actuates said strip-feeding means intermittently to advance the strip through a less distance than that through which the carriage is moved, and provisions for adjusting said connections to vary the amount of such lost motion in accordance with the lengths of different soles.

In testimony whereof I have affixed my signature, in presence of two witnesses.

WILLIAM A. BROWNRIGG.

Witnesses:
A. H. BROWN,
P. W. PEZZETTI.

---

Copies of this patent may be obtained for five cents each, by addressing the "Commissioner of Patents, Washington, D. C."